Figure 1:
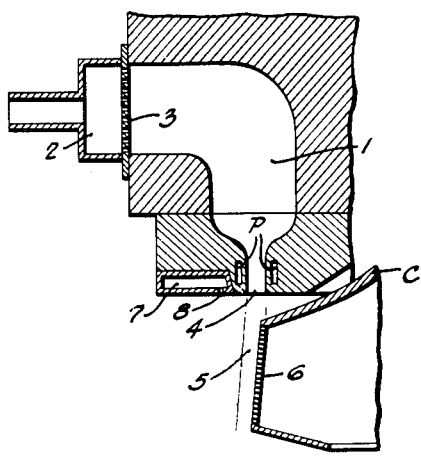

INVENTORS
MARCEL LÉVECQUE
MAURICE CHARPENTIER

United States Patent Office 3,254,977
Patented June 7, 1966

3,254,977
PROCESS AND APPARATUS FOR PRODUCTION OF FIBERS FROM THERMOPLASTIC MATERIAL, PARTICULARLY GLASS FIBERS
Marcel Lévecque, Saint-Gratien, and Maurice Charpentier, Rantigny, France, assignors to Compagnie de Saint-Gobain, Neuilly/Seine (Seine), France, a corporation of France
Filed Feb. 18, 1963, Ser. No. 259,447
The portion of the term of the patent subsequent to Apr. 9, 1980, has been disclaimed
Claims priority, application France, Jan. 27, 1959,
785,098, 785,099, 785,100
6 Claims. (Cl. 65—6)

This application is a continuation-in-part of our applications Serial Nos. 4,085 and 4,143, both filed January 22, 1960, now U.S. Patents Nos. 3,084,525 and 3,084,381, respectively.

The present invention relates to a process for producing fibers from thermoplastic materials, particularly glass fibers, in which the material in melted state, contained in a hollow rotating body provided with orifices at its periphery, is projected through these orifices in the form of threads through the action of centrifugal force. It is already known that to produce fibers of great fineness, the threads should be subjected to gaseous currents at high speed, in particular gaseous currents resulting from the expansion of gases leaving a combustion chamber. These gaseous currents act on the threads of material by carrying them along and drawing them out into very fine fibers.

To effectuate the process, the centrifuge body may have one or several rows of projection orifices in its peripheral wall or band. In order to attain efficient industrial production, it is desirable to increase as much as possible the number of rows of projection orifices, which, of course, tends to increase the height of the peripheral wall of the centrifuge. When the number of these rows is considerable, for example, above twenty, various difficulties are encountered in obtaining fibers of good quality. It is particularly difficult to maintain, because of the induction of cold exterior gases, temperatures of gas sufficiently high to obtain a reheating of the glass projected from the orifices in the lower rows, the pencils or cones of glass priming these threads being then too cold to allow attenuation under favorable conditions.

An object of the invention is the improvement which allows fibers of good quality to be obtained whatever may be the number of rows of projection orifices, that is, regardless of the height of the peripheral band of the hollow rotating body, by decreasing or suppressing the fall in temperature of the gases along the length of the band. Thus, the peripheral wall is maintained at a substantially constant temperature over its entire height, which is due to the fact that the gaseous current which circulates in contact with it and which is designed to maintain the pencils of glass at the suitable temperature, does not undergo any noticeable fall in temperature, since it is isolated from the surrounding atmosphere by the exterior part of the same gaseous current or by a separate gaseous current in enveloping relation thereto.

This improvement consists in surrounding the gaseous currents traversing the length of the peripheral bend, and assuring the attenuation of the threads of material, with one or several hot exterior gaseous currents or flames in such a way that the drawing-out gaseous current preserves a practically uniform temperature during its entire contact with the band.

The hot exterior gaseous current or currents may have the same composition as that of the drawing-out gaseous currents, or different compositions. They may likewise have the same or different temperature and the same or different velocity.

The gaseous currents traversing the length of the band and assuring the drawing-out procedure may issue from or through the expansion orifice of gases resulting from combustion effected previously in a combustion chamber, and these gaseous currents are surrounded by other currents, which prevent the induction of currents of air or gas from the outside, which may change the temperatures of the drawing-out gaseous currents.

According to one method of attaining the invention, there is placed at the outside of the expansion orifice or orifices of an annular combustion chamber arranged coaxially with the rotating centrifuge, organs fed by combustible and comburent which produce aerated flames which are directed toward the gas currents escaping from the expansion orifice or orifices, or which are parallel to said gas currents, the flames being induced by these currents before any induction of external cooling air into the latter is possible.

According to another method of operation of the invention, a second combustion chamber is joined to the first combustion chamber. The orifices of this second chamber discharge in the immediate vicinity and at the outside of the expansion orifice or orifices of the first combustion chamber. Such an arrangement permits separate regulation or control of the two concentric jets as regards velocity and temperature, by acting, for example, on the adjustment of the comburent-combustible ratio. Thus, the exterior jet may be regulated by combustion reduction, allowing combustion to be obtained along its entire course, all the while maintaining an oxidizing atmosphere in contact with the band, and a well-defined temperature in the zone where the fibers are formed.

The second combustion chamber may be supplied by means of gases withdrawn from the principal combustion chamber. In this way a gradient of velocities between the outside periphery of the gaseous jets and the band may be realized very simply by decreasing perceptibly the induction of cold gases.

The expansion orifices of the two combustion chambers may blend into one, or remain separated, and their directions are preferably parallel or at the most at a minimal angle. These expansion orifices may be in the same or different planes but preferably are in the same plane to exclude effectively the induction of external air into the attenuating stream issuing from the inner orifices.

Figure 2:
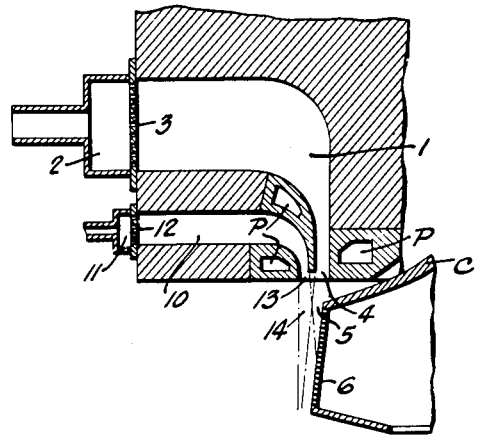
Figure 3:
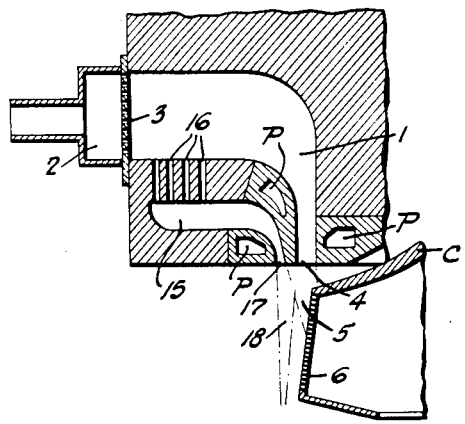
Figure 4:
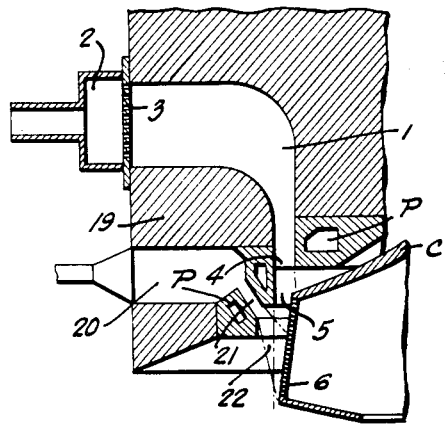

Several embodiments of the invention for realizing the advantageous results enumerated above are illustrated in the accompanying drawings, wherein FIG. 1 is a vertical sectional view of the left end of a rotary centrifuge with the overlying combustion chamber for directing an inner blast of hot gaseous current transversely to the fibers issuing from the centrifuge to effect the attenuation thereof, and which includes an arrangement for providing a protective screen of flames or hot gases surrounding the blast along the entire length of the peripheral wall of the centrifuge;

FIG. 2 is a vertical sectional view of an assembly similar to that shown in FIG. 1 featuring an annular blast of combustion gases surrounded by a second annular screen of combustion gases issuing from a pair of merging annular expansion orifices;

FIG. 3 is a vertical sectional view of an arrangement illustrating a modification of the assembly shown in FIG. 2, with a common source of combustible mixture for the inner and outer blasts of hot gases which issue from concentrically arranged expansion orifices; and FIG. 4 is a vertical sectional view of still a different embodiment of the invention featuring a downward extension of the combustion chamber presenting a physical obstacle against the entry of cooling currents to the upper part of the peripheral wall, and wherefrom the surrounding protective blast is directed towards the lower part of the peripheral wall of the centrifuge across which sweeps the attenuating blast.

In the several embodiments of the invention illustrated in the drawings, it has been assumed that the gas current tranversing the length of the peripheral wall of the rotating body and securing the attenuation of the projected threads into fibers, is obtained by means of a combustion chamber 1 preceded by a mixing chamber 2 of combustible and comburent, with which it communicates through grating 3. This combustion chamber is annular and its orifice 4, which may be a continuous slot or orifices placed close together, is arranged in the usual manner so that the gaseous current 5 at high temperature which escapes from it travels across the band 6 of the rotating body C for the entire height of this body. As is well known in the art, molten thermoplastic material is projected against the inner face of the peripheral wall 6 by a centrifugal distributor or analogous device, wherefrom the material is projected in the form of threads from the plurality of orifices in the wall.

In the embodiment of the invention shown in FIG.1, there is provided coaxially to the combustion chamber 1, a burner 7 producing at its outlet 8 aerated flames which envelope the gaseous current 5 issuing from the combustion chamber 1. Orifice 8 of the burner, consisting of a continuous slot or a series of holes, may be at the same level as orifice 4 of the combustion chamber or may be set higher. It may be upright or inclined in such a way as to produce flames whose direction from the axis, upon leaving the burner, is parallel to that of the hot gases coming out of orifice 4, or turned toward the current of these hot gases at a slight angle to the vertical. The burner 7 may be fed either with a combustible mixture with air to produce the enveloping curtain of aerated flames, or with a combustible gas alone which burns by injection into the gaseous current 5, or by induction into this current. When the annularly disposed slots 8 are disposed vertically, the combustible gas is drawn to the gaseous current by induction, and when these slots are inclined slightly to the vertical, the combustible gas is injected towards the gaseous current 5 to form a protective screen therefor in substantial parallelism therewith.

In the form of the invention shown in FIG. 2, in addition to elements 1, 2 and 3, as shown in FIG. 1, an auxiliary combustion chamber 10 with a mixing chamber 11, and grating 12 is attached to combustion chamber 1, with outlet 13 therefrom in the vicinity of outlet orifice 4 of the combustion chamber 1. Thus, there is obtained at the outlet of the two orifices 4 and 13, a substantially unitary slot or orifice at their lower extremities. A jet of gas 14 may issue from this unitary orifice which is not homogeneous in composition, velocity and temperature with blast 5 by virtue of the fact that rates of flow and ratios of air and gas may be regulated separately in the two chambers 1 and 10.

In the embodiment illustrated in FIG. 3, an auxiliary combustion chamber 15 is used, which is supplied with comburent-combustible mixture through channels 16 connected between chamber 15 and main combustion chamber 1, which is fed with air and gas from mixing chamber 2 through screen 3. The exhaust of hot gases from chamber 15 takes place through an orifice 17 located at a certain distance from orifice 4 of the combustion chamber 1. These hot gases 18 surround the hot gases 5 and are induced by them. Orifice 17 may be located at the same level as orifice 4, as shown, or at a lower level.

In the embodiment shown in FIG. 4, the body of combustion chamber 1 is extended toward the base by a part 19 concentric with the rotating body. In this part 19, an auxiliary combustion chamber 20 is provided with an outlet orifice 21, through which flow hot gases 22. This orifice is inclined in such a way as to direct hot gases 22 toward the peripheral wall 6 of the rotating body, and in enveloping relation to the blast of hot gases 5 issuing from expansion orifice 4 of combustion chamber 1. Thereby there is provided on a predetermined height of the peripheral wall a material obstacle which opposes the induction of induced air, and in the lower part of the band the induction of induced cold air is prevented by the presence of the hot gaseous current 22.

It is advantageous, as shown in the drawings, to make the lips of the slots or orifices of metallic pieces which allow a circulation of refrigerating fluid through the passages P therein.

We claim:

1. The method of producing fibers from heated viscous thermoplastic material, which comprises projecting the heated viscous material by centrifugal force from the peripheral wall of a rapidly rotating body having a plurality of rows of orifices therein through which the viscous material issues in filamentary form, directing hot attenuating combustion gases transversely to planes of emission of the fibers to entrain therein the fibers issuing from the rows of orifices, and completely surrounding said last-mentioned combustion gases with a hot annular curtain of gases having a relatively lower velocity than said combustion gases to prevent an induction of cold external air to maintain a substantially uniform temperature along the entire height of said peripheral wall at the points of exit of said fibers.

2. The method of producing fibers as set forth in claim 1 including the step of producing said hot annular curtain of gases by directing flames in the zone surrounding said hot attenuating combustion gases.

3. The method of producing fibers as set forth in claim 1 including the step of producing said hot annular curtain of gases by introducing a combustible gas in the zone surrounding said hot attenuating combustion gases wherein said combustible burns when it is mixed with induced air.

4. The method of producing fibers as set forth in claim 1 including the step of producing said hot annular curtain of gases by directing a hot current of combustion gases substantially parallel to said hot attenuating combustion gases.

5. The method of producing fibers as set forth in claim 4, including the step of independently regulating the attenuating combustion gases and surrounding hot gases in respect to composition, temperature and velocity.

6. An apparatus for producing fibers from thermoplastic material comprising a centrifuge rotating on a vertical axis and having a peripheral wall provided with a plurality of superposed rows of orifices for discharging the material therethrough by centrifugal force, a combustion chamber above said centrifuge provided with an annularly shaped outlet opening closely adjacent to the upper edge of said peripheral wall for discharging hot attenuating combustion gases from said chamber across said peripheral wall to draw out the fibers issuing therefrom, and a second combustion chamber provided with an orifice associated with said outlet opening to produce an annular heated gaseous stream of lower velocity than said combustion gases and closely surrounding said combustion gases, said second combustion chamber being formed in an extension below said first combustion chamber which presents a physical baffle against the entry of cooling air to the hot combustion gases adjacent to the upper portion of the peripheral wall, with the orifice of the second combustion chamber below the level of the outlet opening from the first combustion chamber to direct the hot gaseous stream issuing therefrom towards the hot combustion gases adjacent to the remaining portion of the peripheral wall.

References Cited by the Examiner

UNITED STATES PATENTS

| | | | |
|---|---|---|---|
| 2,931,422 | 4/1960 | Long | 65—11 |
| 3,012,281 | 12/1961 | Stalego | 65—6 |
| 3,084,380 | 4/1963 | Lévecque et al. | 65—6 |
| 3,084,381 | 4/1963 | Lévecque et al. | 65—6 |
| 3,084,525 | 4/1963 | Lévecque et al. | 65—6 |

DONALL H. SYLVESTER, *Primary Examiner.*

C. E. VAN HORN, *Assistant Examiner.*